Feb. 6, 1923.

J. W. WHITE.
PINION MOUNTING.
FILED DEC. 1, 1920.

Witness

Inventor
John W. White
By his Attorneys
Blackmore, Spencer & Flint

Patented Feb. 6, 1923.

1,444,293

UNITED STATES PATENT OFFICE.

JOHN W. WHITE, OF DETROIT, MICHIGAN, ASSIGNOR TO GENERAL MOTORS CORPORATION, OF DETROIT, MICHIGAN, A CORPORATION OF DELAWARE.

PINION MOUNTING.

Application filed December 1, 1920. Serial No. 427,595.

*To all whom it may concern:*

Be it known that I, JOHN W. WHITE, a citizen of the United States, and a resident of Detroit, county of Wayne, and State of Michigan, have invented certain new and useful Improvements in Pinion Mountings, of which the following is a full, clear, concise, and exact description, such as will enable others skilled in the art to which the invention relates to make and use the same, reference being made therein to the accompanying drawings, which form a part of this specification.

The invention relates to mountings for pinions and like members and more particularly to a mounting having special utility in an assemblage including a bevel pinion and a ring gear as employed in certain types of automobile driving mechanism.

In automobiles including in the final drive differential mechanism of the usual type it is important to reduce as far as possible the dimensions of the differential housing and thereby increase road clearance. In this and similar situations where compactness is a desideratum or where an element, as a pinion, must be mounted upon the end of a shaft and especially when in close proximity to other structures, or where this pinion is of relatively small diameter it is often inconvenient to employ the usual forms of securing means.

The primary object of my invention therefore is to provide a securing means whereby a pinion or the like may be mounted upon the extreme end of a shaft without requiring any parts that extend beyond or pass through the pinion itself.

A further object is to provide a mounting whereby a pinion or the like may be secured upon the end of a shaft and may be provided with a bearing in close proximity to the working surface, as the gear teeth.

A further object is to provide a pinion mounting and supporting construction of especial utility in connection with the driving means for the differential mechanism of an automobile.

Other objects and advantages will appear from the following description taken in connection with the accompanying drawings illustrating one embodiment of my invention and in which Figure 1 is a plan view, partly in section, of a portion of the driving mechanism of an automobile.

Figure 2 is a longitudinal section through a pinion and its related parts and

Figure 3 is an end elevation of the structure shown in Figure 2, parts being broken away.

On the drawings 5 and 6 designate parts of a rear axle housing which may be of any desired character and within which may be housed the differential carrier or frame 9, in which are journalled bevel pinions 10 engaging with bevel gears 11, 11′, secured respectively in driving engagement with the axles 7 and 8. A bevelled ring gear 12 is secured to the frame 9 at one side and with its toothed face on the inner side. The drive pinion 13 is arranged to mesh with the bevelled ring gear and is carried upon the end of the propeller shaft 14.

It will be noted that the propeller shaft is upon the central plane of the differential mechanism and the ring gear 12 has been reduced to the smallest practicable diameter, the toothed portion only extending beyond the differential frame 9. Only a very slight clearance is left therefore between the end of the pinion 13 and the frame 9 and it is obviously impracticable to place a nut or like securing means upon the end of the shaft. Furthermore, owing to the small size of the pinion, necessitated by the reduction of the size of the bevelled gear, and the correspondingly small dimensions of the end of the propeller shaft, it is not desirable to employ any form of securing device which will require drilling or otherwise weakening the shaft or pinion. Accordingly I have provided a mounting in which the securing means is located upon the shaft forwardly of the pinion.

In the embodiment shown the propeller shaft is tapered, as at 15, and provided with a key-way as at 16. The pinion 13 is internally bored to fit the tapered portion of the shaft, and provided with key-way 17. The key 18, seated in key-ways 16, 17, serves to prevent relative rotation of the shaft and pinion. An extension of the body of the pinion forms the neck 19 which not only provides increasing bearing surface upon the shaft but is utilized to secure the pinion to the shaft. For this purpose the neck 19 is threaded at the end as at 20, and a sleeve nut 21 is arranged to engage with the threads on the neck. A collar 22 is formed on the shaft and the sleeve nut is provided with an inwardly extending flange 23 adapted to engage the forward face of the collar. By rotation of the sleeve nut the pinion may be drawn firmly to its seat on the tapered end of the shaft and secured in such position.

Upon the outer surface of the neck 19 and in close proximity to the teeth of the pinion 13 is mounted a bearing, preferably of the anti-friction type, and comprising inner and outer race members, 24, 25, and suitable anti-friction elements, as balls 26. The member 24 may be prevented from movement relatively to the pinion by engaging a shoulder formed at the forward end of the pinion teeth and by a spring ring 27 seated in a groove 28 in the neck 19 and with an inturned end 29 engaging in a hole 30 in the neck. The outer member 25 will be suitably seated in the housing.

Any usual form of housing 31 for the propeller shaft may be employed if desired, and I have shown such housing as being provided with a thrust bearing 32 for the shaft. This bearing is secured in the housing by the nut 33 and a spacing sleeve 34 is arranged between the bearing 32 and the sleeve nut 21.

It will be seen that the structure described provides a very rigid support for the bevel pinion without unduly weakening either it or the supporting shaft, furthermore that the entire assemblage is very compact and permits of a material reduction in the dimensions of the drive mechanism.

It will be understood that various changes in details of construction may be made without departing from the spirit and scope of the invention and therefore I do not wish to be limited to the specific structure shown.

I claim:—

1. In combination, a tapered shaft having an abutment, a member carried upon the tapered portion of said shaft, said member being provided with screw threads and a securing nut engaging said screw threads and said abutment.

2. In combination, a shaft tapered adjacent the end and having an abutment, a pinion having a tapered bore seated upon the tapered portion of said shaft, the pinion having a screw threaded portion, and a sleeve nut engaging said screw-threaded portion and said abutment.

3. In combination, a shaft tapered adjacent the end and having a colllar, a pinion having a tapered bore adapted to seat upon said shaft and a screw-threaded extension, and a sleeve nut adapted to engage said screw threads and having a flange adapted to engage said collar, whereby to draw the pinion to its seat.

4. In combination a shaft having a tapered portion at the end, a pinion seated upon said tapered portion and having an extension beyond its teeth, means for securing said pinion to the shaft, and a bearing mounted upon said extension adjacent to said teeth.

5. In combination, a shaft having a tapered portion and a collar, a pinion adapted to seat upon said tapered portion and having a screw threaded extension, means engaging said collar and screw threads for securing the pinion upon the shaft, and a bearing secured about said extension and adjacent to the toothed portion of said pinion.

6. In a pinion mounting adapted for use in connection with differential mechanism of motor vehicles, the combination with the housing of said mechanism and a bearing supported thereby, of a propeller shaft exteding into said housing, a pinion mounted at the extreme rear end of said shaft, said pinion having a sleeve extending forwardly and supported in said bearing, and means forward of said bearing for securing the pinion to the shaft.

7. In a pinion mounting adapted for use in connection with differential mechanism of motor vehicles, the combination with the housing of said mechanism and a bearing supported thereby, of a propeller shaft extending into said housing, a beveled pinion mounted upon the rear end of said shaft in position to engage the beveled gear of the differential, there being no part of the shaft projecting beyond said pinion, the pinion having a forwardly extending sleeve journaled in said bearing, said shaft being provided with a collar forwardly of said bearing, and means engaging said collar and said sleeve to secure the pinion on the shaft.

In testimony whereof I affix my signature.

JOHN W. WHITE.